Dec. 25, 1956

C. J. KENNEDY

WEB MOTION SENSER

Filed Oct. 20, 1954

2,775,753

INVENTOR.
Charles J. Kennedy
BY Morris A. Rabkin
ATTORNEY.

United States Patent Office 2,775,753

Patented Dec. 25, 1956

2,775,753

WEB MOTION SENSER

Charles J. Kennedy, Haddonfield, N. J., assignor to Radio Corporation of America, a corporation of Delaware Application October 20, 1954, Serial No. 463,541

The terminal fifteen years of the term of the patent to be granted has been disclaimed 3 Claims. (Cl. 340—259)

This invention relates to web reeling systems, and more particularly to means for detecting whether or not a web member is moving with respect to certain fixed objects and obtaining an electric current indicative of such movement.

In a number of instances, certain web materials are fed through associated machinery where desired operations are carried out. An example of such apparatus might be an electronic computer system wherein data is stored on magnetic record tapes. These tapes are fed through appropriate machines where data are read, recorded or amended. In such installations, it is desirable to be able to ascertain, at a place remote from the machine, whether or not the web, or tape, is actually moving through the machine.

Accordingly, it is an object of the present invention to provide means for detecting the movement of a web member through a machine.

It is another object of the present invention to provide detecting means as set forth wherein said detecting means produces an electric signal indicative of the motion of the tape.

It is a further object of this invention to provide a system for controlling certain operative functions of a machine through a control signal obtained from a web motion detecting means as set forth.

In accomplishing these and other objects, there has been provided, in accordance with the present invention, a web contacting member which includes means for producing an electrical signal under the influence of vibrations occasioned by the rubbing of the web member against the web contacting member. The electrical signal producing means may be a piezoelectric crystal element carried by the web contacting member.

A better understanding of this invention may be had from the following detailed description when read in connection with the accompanying drawing, in which.

Figure 1:
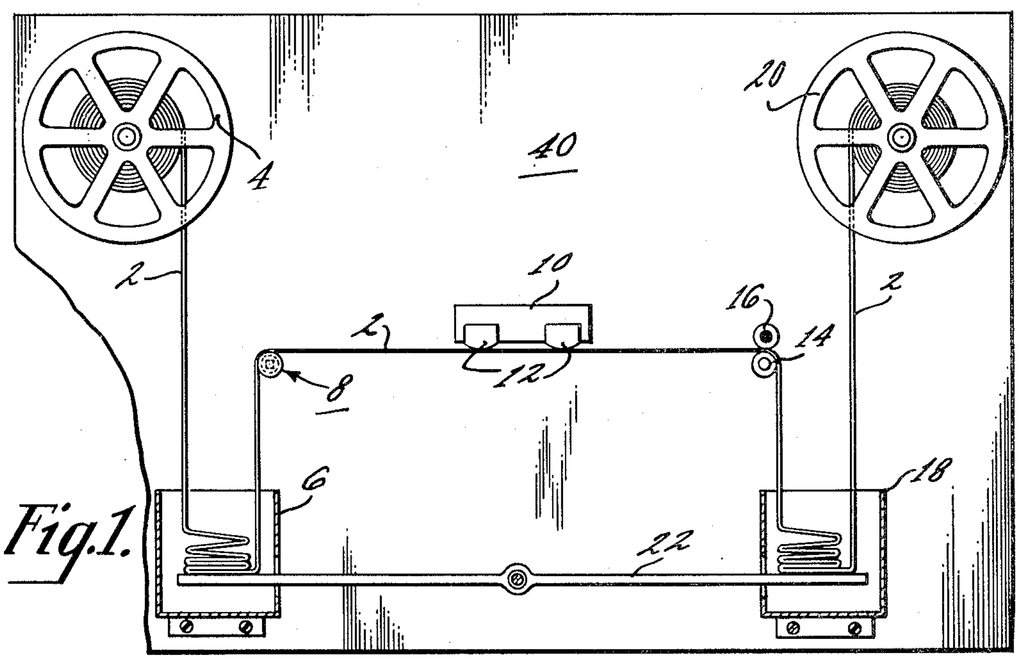
Fig. 1 is a schematic representation of a web feeding system embodying the present invention.

Referring now to the drawing in more detail, there is shown in Fig. 1 a web feeding system of a type suitable for use in magnetic recording computer systems. The web is in the form of a magnetic record tape member 2 which is fed from a supply reel 4 into an intermediate bin 6 thence over a guide member 8. After passing the guide member 8, the tape 2 is advanced past a signal transducer stage 10 which may include one or more signal translating heads 12. The tape 2 is advanced by means of a capstan 14 which cooperates with a pinch roller 16. Leaving the capstan 14, the tape 2 is then fed into a second intermediate bin 18 from thence to a take-up reel 20. The intermediate bins 6 and 18 provide means for accommodating a relatively long, soft loop of tape whereby the tape passing the transducer stage 10 may be accelerated very rapidly without the necessity of first overcoming the inertia of either of the reels. Means such as a balance beam 22 is associated with the bins 6 and 18 to measure the relative quantity of tape in each of the bins 6 and 18. Tilting of the balance beam 22 energizes suitable motors (not shown) for effecting the drive of the two reels. A reeling system involving the use of the bins and the balance beam control does not form a part of this invention, and, therefore, need not be further described.

Systems of the type involving apparatus such as that shown in Fig. 1 are frequently rather complex involving a number of such reeling systems. It is of interest to the operator to be able to ascertain whether or not a web member such as the tape 2 is being advanced through the machine in the prescribed manner. In complex installations, it is frequently impossible for the operator to observe the web reeling systems constituting the installation. It may also be desirable to effect a control over the operation of the system by means such as an interlock which would be operable in response to the movement or non-movement of tape or web through a machine. In order to detect whether or not the web, here the tape 2, is advancing properly through the machine, a web motion detector or senser is provided.

In the illustrated embodiment of the invention, the guide member 8 is used, in addition to its guide function, as a tape motion senser. This guide member is shown more clearly in Figs. 2, 3 and 4. The guide member comprises a stud or post 24 having a threaded end portion 26. The post 24 is bored from the threaded end to provide a hollow receptacle 28 extending well into the body of the post 24. The post 24 is cut away to provide a weakened portion 30 near the end adjacent the threaded portion 26. A piezoelectric crystal 32 is mounted within the hollow receptacle 28 and is secured by a suitable cement 34 to the stud at one end of the hollow receptacle 28. The other end of the crystal 32 is similarly secured to the other end of the stud but on the opposite side of the weakened portion from the first mentioned end of the crystal. Thus any motion which tends to flex the post or stud 24 at the weakened portion 30 will cause an accompanying flexing of the crystal 32. The crystal being piezoelectric, there is developed an electric current corresponding to the flexure. Suitable electrodes 36 are provided for collecting the developed electric current and transmitting it to lead wires 38.

Figures 2, 3, 4, 5:
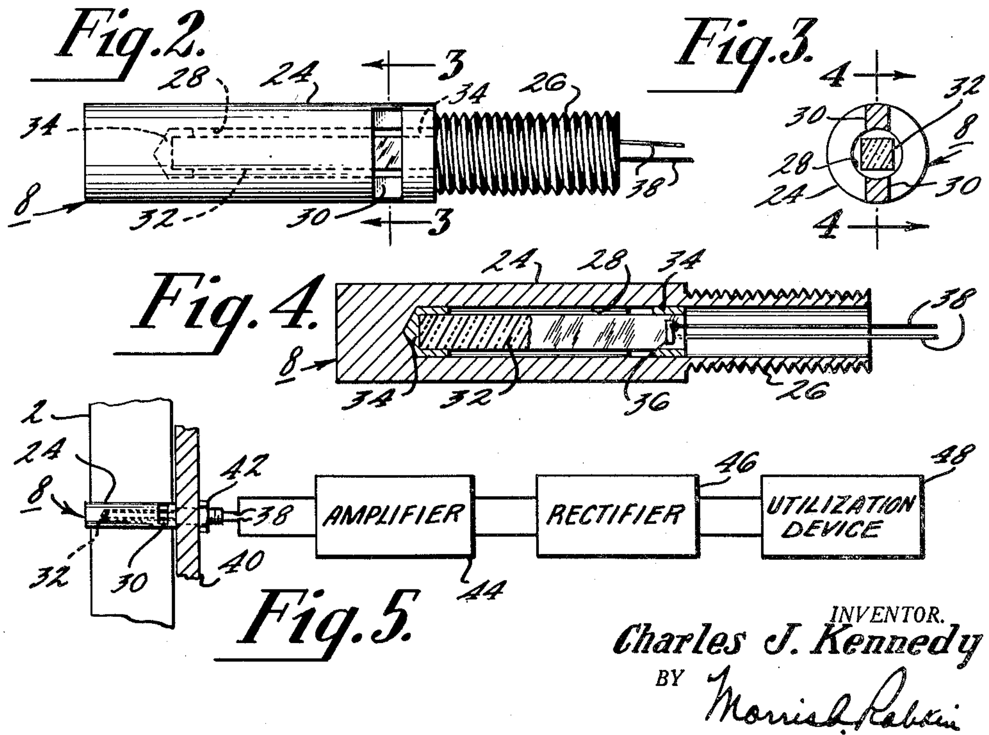
Fig. 2 is an enlarged view of a web motion detecting device made in accordance with the present invention.
Fig. 3 is a cross-sectional view taken along the line 3—3 of Fig. 2 as viewed in the direction of the arrows.
Fig. 4 is a sectional view taken along the line 4—4 of Fig. 3 as viewed in the direction of the arrows.
Fig. 5 is a schematic representation of a control system utilizing the signals developed by a web motion detector embodying features shown in Figs. 2 to 4.

In Fig. 5, there is shown an electric circuit including the guide member 8. The threaded portion of the guide member 8 is passed through a suitable hole in a mounting panel 40. The stud portion 24 extends outwardly from the panel 40 and is held in place by a nut 42 on the reverse side of the panel 40. The lead wires 38 from the crystal 32 are connected to a suitable amplifier 44. The amplified signal may then be fed to a rectifier 46, thence to a suitable utilization device 48. The utilization device 48 may be merely an indicator of some suitable type such as a light bulb. On the other hand, the utilization device may include an interlock system for controlling the operation of the machine. For example, if the tape or web member is not being fed through the machine, no signal is developed by the crystal and the interlock device may cause the machine to be shut down to prevent serious jamming.

With a web motion sensing device of the type shown in Figs. 2 to 4, in a system such as that shown in Figs. 1 and 5, the tape or web passing over the stud 24 causes the stud to vibrate due to the frictional engagement therebetween. This vibration of the stud is transferred to the crystal 32. Vibration of the crystal produces a corresponding electric current, as aforesaid.

Thus it may be seen that there has been provided means for detecting the movement of a web member through a machine which means produces an electric signal indicative of the motion of the tape and which is simple in structure and operation.

What is claimed is:

1. In a web driving system, a web motion contacting device comprising a web guide member positioned to slidingly engage a surface of a web member, said web member having a direction of travel parallel to said surface and bending about said guide member at an angle of substantially 90°, said guide member being at the apex of said angle, said guide member including a hollow stud having an area of reduced cross-section, said area of reduced cross-section defining a bend-point about which said stud is vibratable in response to motion of said web member, and a piezoelectric crystal mounted in the hollow of said stud and bridging said area of reduced cross-section whereby vibration of said stud about said area of reduced cross-section in response to motion of said web member about said guide member in said direction of travel causes flexure of said crystal to generate electrical signals corresponding to said web member travel induced vibrations.

2. In a web driving system, a web motion contacting device comprising a web guide member positioned to slidingly engage a surface of a web member, said web member having a direction of travel parallel to said surface and bending about said guide member at an angle of substantially 90°, said guide member being at the apex of said angle, said guide member including a hollow stud having an area of reduced cross-section, said area of reduced cross-section defining a bend-point about which said stud is vibratable in response to motion of said web member, and a piezoelectric crystal mounted in the hollow of said stud and bridging said area of reduced cross-section whereby vibration of said stud about said area of reduced cross-section in response to motion of said web member about said guide member in said direction of travel causes flexure of said crystal to generate electrical signals corresponding to said web member travel induced vibrations, and further means responsive to said electrical signals for controlling the operation of the said web driving system.

3. In a magnetic tape system having a tape transport means for a tape to be transported and magnetic transducing means, a tape motion detector comprising a guide member connected to said tape transport system and cooperating with said tape transport means and said transducing means to maintain said tape in contact with said transducing means, a vibratable pick-up means mounted within said guide member for vibration in response to motion of the said tape moving around said guide member in frictional contact with said guide member, and signalling means connected to said pick-up means for producing a distinctive signal in response to tape movement-induced vibrations of the said guide member.

References Cited in the file of this patent

UNITED STATES PATENTS

| | | |
|---|---|---|
| 2,524,579 | Taylor | Oct. 3, 1950 |
| 2,561,763 | Waters et al. | July 24, 1951 |
| 2,578,620 | Wilhelm | Dec. 11, 1951 |